United States Patent
Park et al.

(10) Patent No.: US 9,882,516 B2
(45) Date of Patent: Jan. 30, 2018

(54) METHOD FOR DETERMINING OFFSET OF RESOLVER OF VEHICLE MOTOR

(71) Applicant: Hyundai Motor Company, Seoul (KR)

(72) Inventors: Joo Young Park, Seoul (KR); Mu Shin Kwak, Gyeonggi-do (KR); Jun Mo An, Gyeonggi-do (KR); Su Hyun Bae, Daegu (KR); Sung Kyu Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/176,534

(22) Filed: Jun. 8, 2016

(65) Prior Publication Data

US 2017/0170757 A1   Jun. 15, 2017

(30) Foreign Application Priority Data

Dec. 9, 2015  (KR) .................. 10-2015-0174737

(51) Int. Cl.
| | |
|---|---|
| *G05B 19/31* | (2006.01) |
| *H02P 6/16* | (2016.01) |
| *H02P 21/22* | (2016.01) |
| *B60W 20/40* | (2016.01) |
| *H02P 27/08* | (2006.01) |
| *G01D 5/20* | (2006.01) |
| *H02P 21/12* | (2016.01) |

(52) U.S. Cl.
CPC .............. *H02P 6/16* (2013.01); *B60W 20/40* (2013.01); *G01D 5/2073* (2013.01); *H02P 21/12* (2013.01); *H02P 21/22* (2016.02); *H02P 27/08* (2013.01); *B60Y 2304/07* (2013.01)

(58) Field of Classification Search
CPC ......... G05B 19/33; G05B 19/351; H02P 6/16; H02P 21/0035; H02P 21/06; H02P 21/146; H02P 2207/05; G01D 5/2073
USPC ... 318/400.02, 605, 797, 800, 801, 599, 811
See application file for complete search history.

(56) References Cited

U.S. PATENT DOCUMENTS

| | | | |
|---|---|---|---|
| 7,298,109 B2 * | 11/2007 | Sakamaki | ............... B62D 5/046 318/400.07 |
| 7,659,688 B2 * | 2/2010 | Schulz | .................... H02P 21/06 318/609 |

(Continued)

FOREIGN PATENT DOCUMENTS

| | | |
|---|---|---|
| JP | 2012-75236 | 4/2012 |
| KR | 10-2007-0096361 | 10/2007 |

(Continued)

*Primary Examiner* — Rina Duda
(74) *Attorney, Agent, or Firm* — Mintz Levin Cohn Ferris Glovsky and Popeo, P.C.; Peter F. Corless

(57) ABSTRACT

A method for measuring an offset of a resolver is arranged so as to frequently measure and correct the offset of the resolver by actively performing zero current control of a motor. The method includes steps of: determining whether a torque command value of the motor and a magnetic flux value or reverse magnetic flux value of the motor respectively fall within a first range and a second range, which have been set in advance; controlling the motor to perform zero current control for a preset time period when the torque command value of the motor falls within the first range and the magnetic flux value or reverse magnetic flux value of the motor falls within the second range; and measuring the offset of the resolver for the preset time period.

6 Claims, 4 Drawing Sheets

(56) References Cited

U.S. PATENT DOCUMENTS

2006/0113949 A1* 6/2006 Nishimura ............. H02K 19/36
318/723
2013/0134915 A1* 5/2013 Chung ................... H02P 29/02
318/400.14

FOREIGN PATENT DOCUMENTS

| KR | 10-2011-0126332 | 11/2011 |
| KR | 10-2013-0060047 | 6/2013 |
| KR | 10-2013-0078955 A | 7/2013 |

* cited by examiner

METHOD FOR DETERMINING OFFSET OF RESOLVER OF VEHICLE MOTOR

CROSS REFERENCE TO RELATED APPLICATION

The present application claims under 35 U.S.C. § 119(a) the benefit of Korean Patent Application No. 10-2015-0174737, filed Dec. 9, 2015, the entire contents of which are incorporated by reference herein.

BACKGROUND

1. Field of the Invention

The present invention relates generally to a method for measuring an offset of a resolver, more particularly to a method for measuring an offset of a resolver, which may frequently measure and correct the offset of the resolver by actively performing zero current control in a motor while a vehicle is driven.

2. Description of the Related Art

A Motor Control Unit (MCU) is used for controlling a motor, such as a synchronous motor or an induction motor, which are used in electric vehicles or hybrid vehicles. In order to control such a motor, the MCU performs calculations for setting coordinates depending on the position of the magnetic flux of the motor. In this case, a resolver is used to detect the absolute position of a rotor of the motor.

A resolver is a type of electronic transformer. When an excitation voltage is applied to a primary winding (input) and a shaft is rotated, a magnetic coupling coefficient changes, and thus a voltage having variable amplitude is generated in a secondary winding (output). This voltage makes the secondary winding be arranged to correspond with the sine and cosine of the rotation angle of the shaft. Therefore, the rotation angle of the resolver may be acquired by determining the ratio of the amplitude of the sine output to the amplitude of the cosine output.

The resolver operated as described above provides the MCU with the rotor position by detecting the velocity and phase of a motor, and the MCU uses the rotor position to generate a torque control command and a speed control command.

Meanwhile, because of various reasons, such as error in assembling a resolver and a motor, an inaccurate position of a coil in the resolver, and the like, an offset may be generated in the output of the resolver, and thus the absolute position of the rotor cannot be accurately measured due to the offset. Accordingly, various methods for measuring and correcting the resolver offset have been proposed.

According to a conventional method for measuring an offset of a resolver, while a vehicle is driven, a mode in which zero current control can be performed is determined, and the offset of a resolver is measured when entering the corresponding mode.

However, according to the conventional method, because the section in which the zero current control can be performed mostly corresponds to a zero torque section and there are few zero torque sections while a vehicle is driven, the frequency of measuring the resolver offset is very low. Also, if the zero torque section is prolonged for measuring the resolver offset, it may adversely affect drivability of the vehicle.

The foregoing is intended merely to aid in the understanding of the background of the present invention, and is not intended to mean that the present invention falls within the purview of the related art that is already known to those skilled in the art.

SUMMARY

Accordingly, the present invention provides a method for measuring an offset of a resolver, which may frequently measure and correct the offset of the resolver by actively performing zero current control in a motor while a vehicle is driven.

In order to achieve the above object, according to one aspect of the present invention, there is provided a method for measuring an offset of a resolver, which includes the steps of: determining, by a resolver offset measurement unit, whether a torque command value of a motor and a magnetic flux value or a reverse magnetic flux value of the motor respectively fall within a first range and a second range, which have been set in advance; controlling, by the resolver offset measurement unit, a motor to perform zero current control for a preset time period when the torque command value of the motor falls within the first range and the magnetic flux value or the reverse magnetic flux value of the motor falls within the second range; and measuring, by the resolver offset measurement unit, the offset of the resolver for the preset time period.

In an embodiment of the present invention, the first range and the second range may be ranges in which Pulse Width Modulation (PWM) control of an inverter, which supplies driving power to the motor while a vehicle is driven, is configured to be turned off.

In an embodiment of the present invention, a lower limit of the second range may be determined depending on a range in which flux weakening control of the motor is not performed.

In an embodiment of the present invention, a lower limit of the second range may be determined in a range that enables a speed of the motor to be equal to or greater than a preset value.

In an embodiment of the present invention, the method may further include turning off PWM control of an inverter, which supplies driving power to the motor, if a state in which the torque command value of the motor falls within the first range and the magnetic flux value or the reverse magnetic flux value of the motor falls within the second range is maintained after the offset measurement step.

In order to achieve the above object, according to another aspect of the present invention, there is provided a method for measuring an offset of a resolver that measures the offset of the resolver while controlling a motor to perform zero current control and turns off PWM control of an inverter, which supplies driving power to the motor, if a torque command value of the motor and a magnetic flux value or a reverse magnetic flux value of the motor respectively fall within ranges in which the PWM control of the inverter is configured to be turned off.

A non-transitory computer readable medium containing program instructions executed by a processor can include: program instructions that determine whether a torque command value of a motor and a magnetic flux value or a reverse magnetic flux value of the motor respectively fall within a first range and a second range, which have been set in advance; program instructions that control the motor to perform zero current control for a preset time period when the torque command value of the motor falls within the first range and the magnetic flux value or the reverse magnetic flux value of the motor falls within the second range; and program instructions that measure an offset of a resolver for the preset time period.

According to the method for measuring an offset of a resolver as described above, a resolver may be calibrated by actively performing zero current control in a section in which it has no effect on drivability while a vehicle is driven. Accordingly, the method for measuring the offset of the resolver remarkably increases the frequency of entry into a resolver calibration section, thus significantly increasing the reliability of the output value of the resolver. Also, according to this method, the calibration of the resolver, which is originally included in a vehicle assembly process, may be performed whenever the vehicle is driven. Accordingly, the resolver calibration process may be skipped in the vehicle assembly process, thus simplifying the assembly process.

Also, according to the method for measuring an offset of a resolver, a driving condition enabling the measurement of an offset of a resolver is set to a section in which PWM control is configured to be turned off. Accordingly, in addition to the correction of the resolver offset, the PWM control can be turned off, thus unnecessary switching loss may be removed. Therefore, efficiency of a motor system may be enhanced, and fuel efficiency of the vehicle may be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a method for measuring an offset of a resolver according to various embodiments of the present invention will be described in detail with reference to the accompanying drawings.

Figure 1:
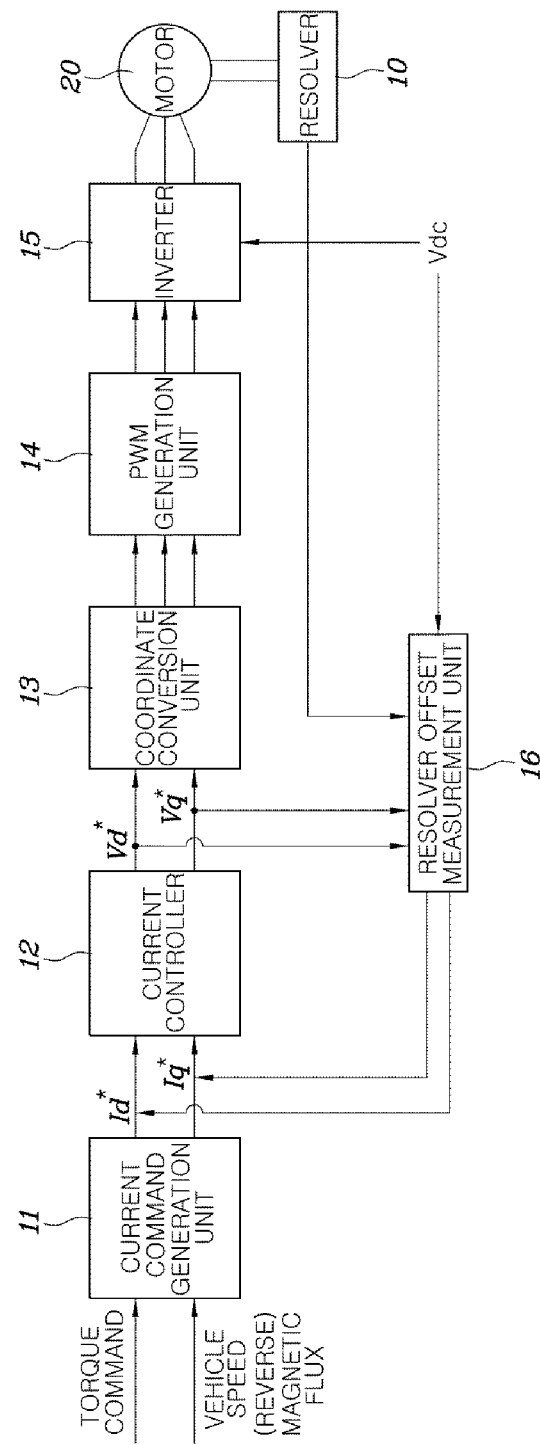
FIG. 1 is a block diagram illustrating an example of a Motor Control Unit (MCU) to which a method for measuring an offset of a resolver according to an embodiment of the present invention is applied.

FIG. 1 is a block diagram illustrating an example of a Motor Control Unit (MCU) to which a method for measuring an offset of a resolver according to an embodiment of the present invention is applied. The MCU illustrated in FIG. 1 is a type of integrated control module arranged for controlling a motor 20 of a vehicle, and preferably includes an inverter 15 that provides a 3-phase voltage to the motor, but various modifications are possible.

Referring to FIG. 1, the MCU may include a current command generation unit 11, a current controller 12, a coordinate conversion unit 13, a PWM generation unit 14, the inverter 15, and a resolver offset measurement unit 16.

The current command generation unit 11 receives a command for controlling a motor or information about a vehicle condition from a high-level controller (not illustrated), and generates and outputs current commands Id* and Iq* corresponding thereto. The command or the information about the vehicle condition, input from the high-level controller, may include a torque control command, a speed control command, information about a magnetic flux, and the like. Also, the current command generation unit 11 may include a current command map in which D-axis and Q-axis current commands Id* and Iq* corresponding to the input information have been determined in advance.

The current controller 12 outputs D-axis and Q-axis voltages Vd* and Vq* by performing current control to make the current of the inverter follow the D-axis and Q-axis current commands Id* and Iq*. The current controller 12 may include a Proportional-Integral (PI) controller. Here, the PI controller receives a measured current by feedback and performs PI control to make the measured current follow the D-axis and Q-axis current commands Id* and Iq*, the measured current being acquired by detecting each of phase currents provided from the inverter 15 to the motor 20 and by converting the current into a DQ current.

The coordinate conversion unit 13 switches the voltage command values Vd* and Vq* from DQ-axis phase voltages into 3-phase voltages or vice versa, and the PWM generation unit 14 generates a Pulse Width Modulation (PWM) switching signal based on the converted voltage command values and transmits the signal to the inverter 15. The inverter 15 switches the switch elements therein based on the received signal, whereby each phase current for driving a motor is output.

The resolver offset measurement unit 16 is a component for implementing a method for measuring an offset of a resolver according to an embodiment present invention. The resolver offset measurement unit 16 controls the D-axis and Q-axis current commands Id* and Iq*, which are input to the current controller 12, depending on the range of a torque command, which is input from the high-level controller to the current control generation unit 11, and the range of a magnetic flux (or a reverse magnetic flux), which is represented as a ratio of $V_{dc}$ to $\omega_r$, that is, a ratio of the voltage input to the inverter 15 to the motor speed. As a result, entry into a state in which an offset of the resolver can be measured is possible, and the offset of the resolver 10 can be measured. Here, the speed $\omega_r$ of the motor 20 may be detected by various methods known in the related art.

Figure 2:
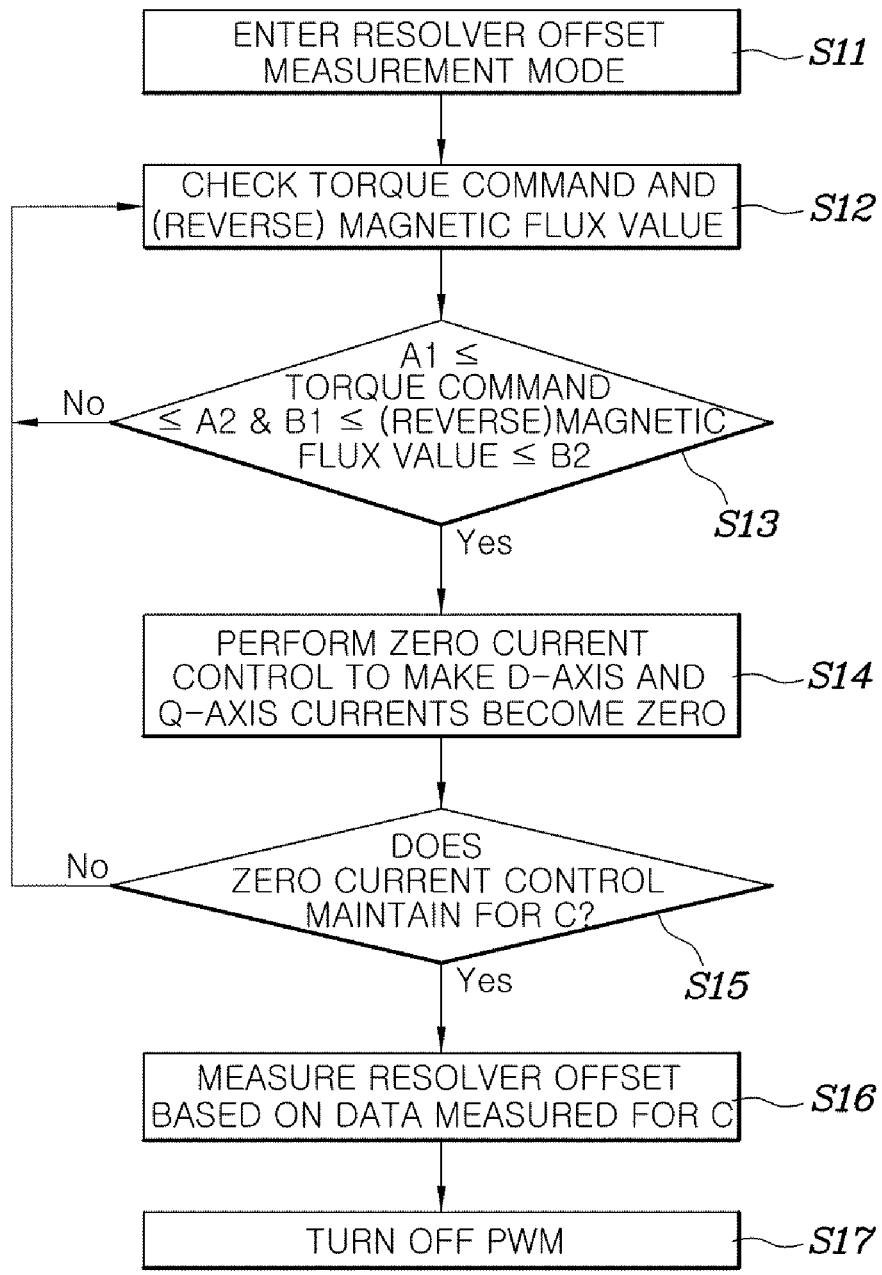
FIG. 2 is a flowchart illustrating a method for measuring an offset of a resolver according to an embodiment of the present invention.

FIG. 2 is a flowchart illustrating a method for measuring an offset of a resolver according to an embodiment of the present invention.

Referring to FIG. 2, the method for measuring an offset of a resolver according to an embodiment of the present invention may be configured to include a motor state determination step (S11, S12, and S13) for determining whether the torque command value of the motor 20 and the magnetic flux value or reverse magnetic flux value of the motor 20 respectively fall within a first range and a second range, which have been set in advance; a zero current control step (S14 and S15) for controlling the motor to perform zero current control for a preset time period when the torque command value of the motor 20 falls within the first range and the magnetic flux value or the reverse magnetic flux value of the motor 20 falls within the second range; and an offset measurement step (S16) for measuring the offset of the resolver for the preset time period.

First, when attempting to measure the offset of the resolver 10 by entering a resolver offset measurement mode at step S11, the resolver offset measurement unit 16 receives the torque command, which is input to the current command generation unit 11, the input voltage $V_{dc}$ of the inverter 15, and the speed of the motor 10; calculates a magnetic flux or a reverse magnetic flux using the magnitude of the torque command, the input voltage $V_{dc}$, and the motor speed $\omega_r$; and checks the magnitude of the magnetic flux or reverse magnetic flux at step S12.

At step S12, the resolver offset measurement unit 16 may calculate the magnetic flux using the following equation:

$$\sqrt{\lambda_d^2 + \lambda_q^2} \le \frac{V_{dc}}{\sqrt{3}\,\omega_r} = \lambda_{max}$$

where $\lambda_d$ denotes a magnetic flux interlinkage of a d-axis, $\lambda_q$ denotes a magnetic flux interlinkage of a q-axis, and $\lambda_{max}$ denotes a ratio of the voltage $V_{dc}$, which is input to the inverter 15 (that is, a battery voltage), to the motor speed $\omega_r$, $\lambda_{max}$ meaning the maximum magnetic flux. The left side of the inequality sign corresponds to $\lambda_{mag}$, which is the magnitude of a magnetic flux interlinkage inside the motor.

In an embodiment of the present invention, the maximum magnetic flux $\lambda_{max}$, which is the ratio of the voltage $V_{dc}$ to the motor speed $\omega_r$, may be used as a magnetic flux measured by the resolver offset measurement unit 16, the voltage $V_{dc}$ being input to the inverter 15. Also, the resolver offset measurement unit 16 may use the calculated magnetic flux or the reverse magnetic flux, which is an inverse number of the magnetic flux, for the determination of whether an offset of the resolver can be measured, which will be described later.

Subsequently, the resolver offset measurement unit 16 may determine whether the checked torque command and the magnetic flux value or the reverse magnetic flux value respectively fall within the first range and the second range, which have been set in advance. The resolver offset measurement unit 16 determines whether the torque command is present between a preset minimum value A1 and a preset maximum value A2, and whether the magnitude of the magnetic flux or reverse magnetic flux is present between a preset minimum value B1 and a preset maximum value B2.

The range used for determining the torque command and the magnitude of the magnetic flux (reverse magnetic flux) corresponds to a condition that enables turning off PWM control of the inverter 15. That is, the PWM control is turned off in a driving section in which it has no effect on drivability. Accordingly, unnecessary switching loss is removed, thus the efficiency of a motor system may be enhanced and fuel efficiency of the vehicle may be improved.

In other words, at step S13, the resolver offset measurement unit 16 determines the conditions of the torque command and magnetic flux (reverse magnetic flux) in which drivability is not affected by turning off the PWM control of the inverter 15. Then, when these conditions are satisfied, the resolver offset measurement unit 16 performs zero current control in order to measure an offset of the resolver, which will be described later.

Particularly, when setting the range of the magnetic flux, the minimum value B1 should be determined in the range in which the flux weakening control of the motor is not performed. That is, by setting a suitable minimum value B1, PWM control is configured to be turned off in the range in which the flux weakening control of the motor is not performed. Also, because the measurement of an offset of the resolver 10 requires the motor speed to be greater than a certain speed, the magnetic flux value should be set to be higher than a certain level. Accordingly, in consideration this, the minimum value B1 is determined.

Subsequently, when the conditions determined at step S13 are satisfied, the resolver offset measurement unit 16 controls the D-axis and Q-axis currents so that the currents become zero in order to measure the offset of the resolver. That is, the resolver offset management unit 16 ignores the current commands, output from the current command generation unit according to the torque command, and sets the D-axis and Q-axis current commands Id* and Iq* to zero so as to perform zero current control.

Also, in an embodiment of the present invention, the resolver offset measurement unit 16 actively maintains the time during which the zero current control is performed for a preset time period at step S15. As described above, an embodiment of the present invention determines the torque command and the magnitude of the magnetic flux (reverse magnetic flux) and performs zero current control when the condition in which the PWM control of the inverter is configured to be turned off is satisfied. Therefore, it is possible to actively set a section in which the zero current control can be performed and to increase a time period in which the offset of the resolver can be measured and the frequency of the measurement compared to a conventional art in which the offset of the resolver is measured only when the condition for the zero current control is satisfied.

Subsequently, the resolver offset measurement unit 16 collects data that are necessary for measuring an offset of the resolver for the preset time period C, and may measure the offset of the resolver based on the collected data. At step S16, when the D-axis and Q-axis currents approach 0 by the zero current control performed at step S14, the resolver offset measurement unit 16 may measure the offset of the resolver using a motor's voltage equation from which the current elements are eliminated. Then, the resolver offset measurement unit 16 turns off the PWM control of the inverter 15 at step S17 in order to improve the fuel efficiency of a vehicle.

Figure 3:
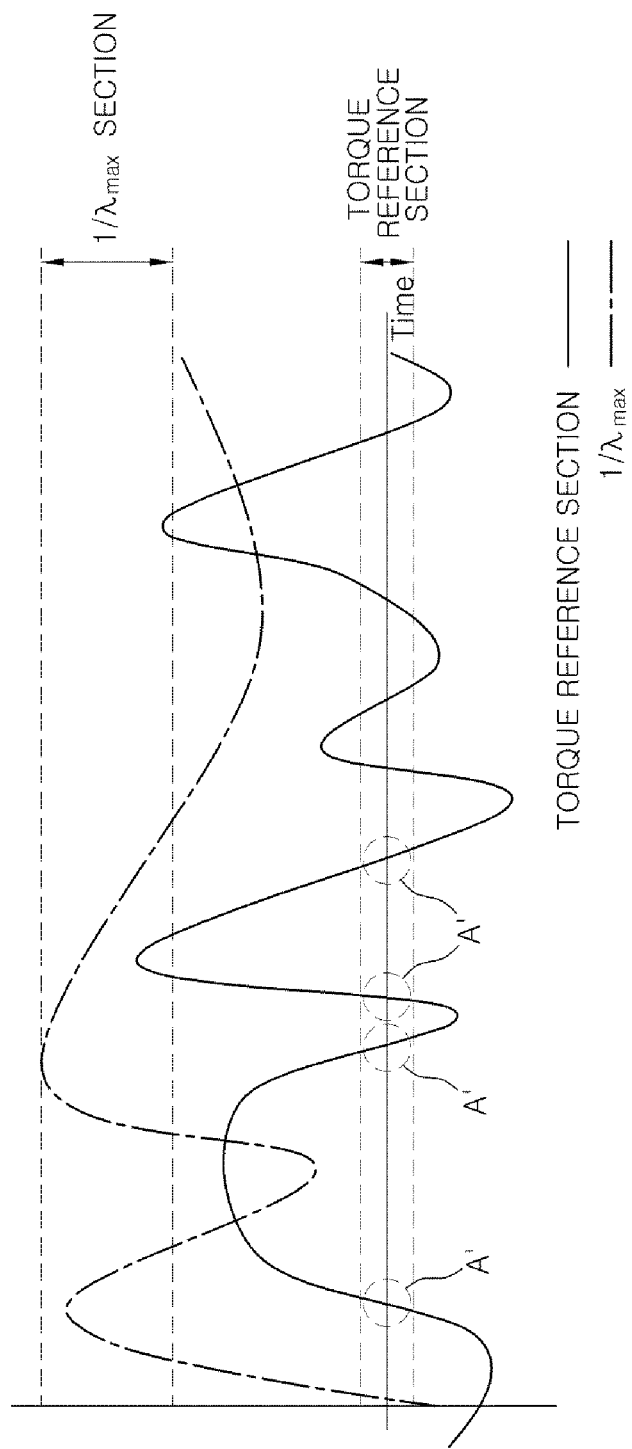
FIG. 3 illustrates a section in which an offset of a resolver can be measured according to a driving pattern in a method for measuring an offset of a resolver according to an embodiment of the present invention.

FIG. 3 illustrates a section in which an offset of a resolver can be measured according to a driving pattern in a method for measuring an offset of a resolver according to an embodiment of the present invention.

As illustrated in FIG. 3, in the method for measuring an offset of a resolver according to an embodiment of the present invention, the time point A at which the offset of the resolver can be measured is frequently generated within a torque command reference section and a magnetic flux (reverse magnetic flux) reference section.

Figure 4:
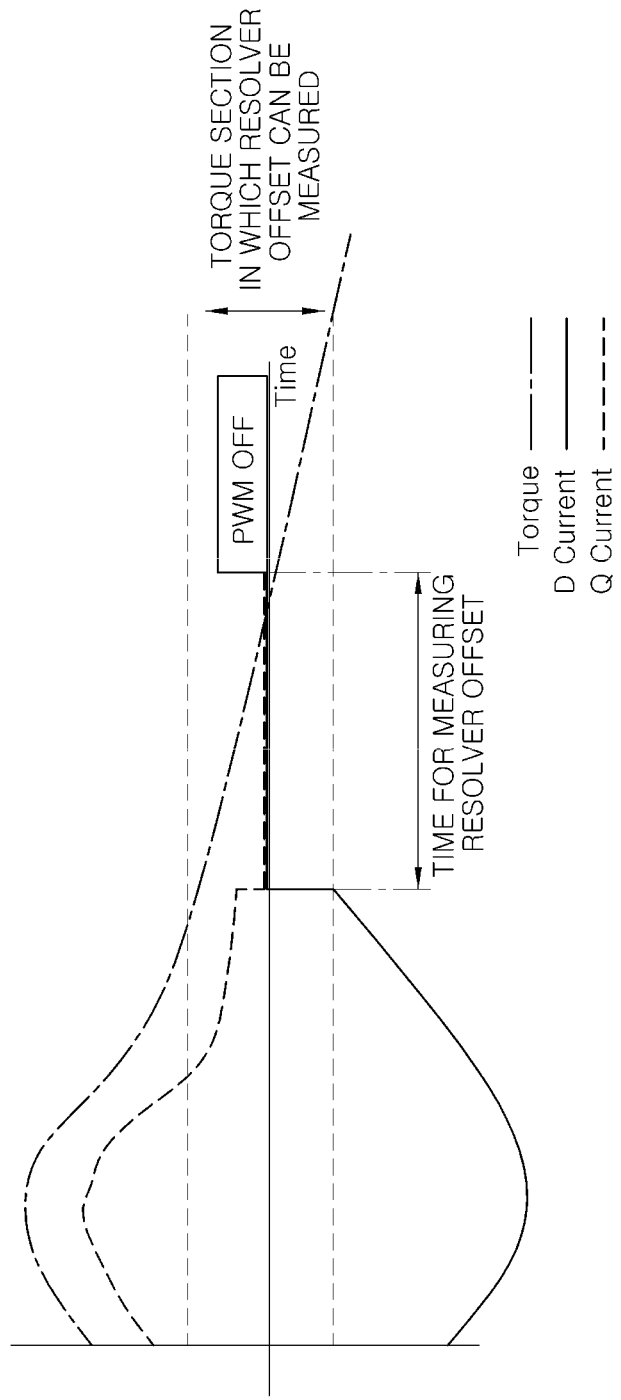
FIG. 4 is a view illustrating a D-axis current, a Q-axis current, and PWM control in a section in which an offset of a resolver can be measured in a method for measuring an offset of a resolver according to an embodiment of the present invention.

FIG. 4 is a view illustrating a D-axis current, a Q-axis current, and a PWM control method within the section in which an offset of a resolver can be measured in a method for measuring an offset of a resolver according to an embodiment of the present invention.

As illustrated in FIG. 4, when the torque command enters a preset reference range and the magnetic flux (reverse magnetic flux) (not illustrated) also enters a preset reference range, the resolver offset measurement unit 16 initiates zero current control by setting the D-axis and Q-axis current commands Id* and Iq*, which are input to the current controller 12, to zero, and thereby the D-axis and Q-axis currents become zero. The resolver offset measurement unit 16 actively sets the time period C during which zero current control is performed as long as needed, and measures the offset of the resolver 10 for the time period. Then, if the torque command and the magnetic flux continuously stay in the preset range after the time period C has passed, the PWM control of the inverter 15 is turned off in order to increase the fuel efficiency.

As described above, the method for measuring an offset of a resolver according to an embodiment of the present invention may calibrate a resolver by actively performing zero current control in a section in which it has no effect on drivability while a vehicle is driven. Accordingly, the frequency of entry into a resolver calibration section is remarkably increased compared to a conventional art, thus significantly increasing the reliability of the output value of the resolver. Also, according to this method, the calibration of the resolver, which is originally included in a vehicle assembly process, may be performed whenever the vehicle is driven. Accordingly, the resolver calibration process may be skipped in the vehicle assembly process, thus it may contribute to simplification of the assembly process.

Also, the method for measuring an offset of a resolver according to an embodiment of the present invention sets a driving condition enabling the measurement of an offset of a resolver to a section in which PWM control is configured to be turned off. Accordingly, in addition to the correction of the resolver offset, the PWM control is configured to be turned off, thus unnecessary switching loss may be removed. Therefore, efficiency of a motor system may be enhanced, and fuel efficiency of a vehicle may be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for measuring an offset of a resolver, comprising the steps of:
   determining, by a resolver offset measurement unit, whether a torque command value of a motor and a magnetic flux value or a reverse magnetic flux value of the motor respectively fall within a first range and a second range, which have been set in advance;
   controlling, by the resolver offset measurement unit, the motor to perform zero current control for a preset time period when the torque command value of the motor falls within the first range and the magnetic flux value or the reverse magnetic flux value of the motor falls within the second range; and
   measuring, by the resolver offset measurement unit, the offset of the resolver for the preset time period.

2. The method of claim 1, wherein the first range and the second range are ranges in which Pulse Width Modulation (PWM) control of an inverter, which supplies driving power to the motor while a vehicle is driven, is configured to be turned off.

3. The method of claim 1, wherein the second range is determined depending on a range that prevents flux weakening control of the motor.

4. The method of claim 1, wherein the second range is determined in a range that enables a speed of the motor to be equal to or greater than a preset value.

5. The method of claim 1, further comprising the step of:
   turning off Pulse Width Modulation (PWM) control of an inverter, which supplies driving power to the motor, if a state in which the torque command value of the motor falls within the first range and the magnetic flux value or the reverse magnetic flux value of the motor falls within the second range is maintained after the offset measurement step.

6. A non-transitory computer readable medium containing program instructions executed by a processor, the computer readable medium comprising:
   program instructions that determine whether a torque command value of a motor and a magnetic flux value or a reverse magnetic flux value of the motor respectively fall within a first range and a second range, which have been set in advance;
   program instructions that control the motor to perform zero current control for a preset time period when the torque command value of the motor falls within the first range and the magnetic flux value or the reverse magnetic flux value of the motor falls within the second range; and
   program instructions that measure an offset of a resolver for the preset time period.

* * * * *